Patented Dec. 25, 1928.

1,696,409

UNITED STATES PATENT OFFICE.

IWAN OSTROMISLENSKY, OF NEW YORK, N. Y., ASSIGNOR TO REVERE RUBBER COMPANY, OF CHELSEA, MASSACHUSETTS, A CORPORATION OF RHODE ISLAND.

PROCESS FOR VULCANIZING RUBBER AND PRODUCTS OBTAINED THEREBY.

No Drawing. Application filed March 24, 1925. Serial No. 18,056.

This invention relates to processes for vulcanizing rubber and to products obtained thereby.

In my Patent No. 1,249,180 of Dec. 4, 1917, I described the vulcanization of rubber without sulphur by the use of organic oxygen-containing compounds such as nitro compounds. In this patent vulcanization of rubber is carried out with nitro compounds and preferably in the presence of an amine and an inorganic oxide.

The present invention relates to similar processes of vulcaization without sulphur by the aid of organic nitro compounds and this is one of the objects of the invention. The primary object is to provide a method for accelerating the vulcanization of rubber with nitro compounds by the addition of elements of the carbon group.

The invention also has for an object the preparation of rubber which may be vulcanized over comparatively extended periods of time without danger of over-vulcanization. Still another object of the invention is to accelerate the vulcanization of rubber in the presence of nitro compounds with inert compounding ingredients.

Having a particular embodiment in mind, but not desiring to limit the invention beyond what may be required by the prior art, I may describe the invention briefly as consisting in the addition of trinitrobenzol and an element of the carbon group, together with an anti-aging material such as an amine, to rubber, and bringing about vulcanization. More particularly the invention embraces the addition of 1. 3. 5 trinitrobenzol, carbon and an amine to rubber, and vulcanizing the rubber.

As a specific example, the following may be used: rubber 100, 1. 3. 5 trinitrobenzol 2, aniline 1, carbon black 150. This compound may be cured for 20 minutes at 40 lbs. steam pressure in a mold and for increasing lengths of time up to 120 minutes without causing much change in the physical properties such as tensile strength, stretch, set. The vulcanization of compounds of the type given in the example is appreciably accelerated by the addition of metals combined with the elements of the oxygen group. Examples of such combinations are: metallic oxides, sulphides and the like, as described in my U. S. Patent No. 1,249,180, of Dec. 4, 1917. Selenides and tellurides may also be employed.

I have discovered that elements of the carbon group in the periodic system have the property of accelerating the vulcanization of rubber by nitro compounds, and at the same time adding interesting new physical characteristics to the vulcanized rubber. By means of these accelerating agents, the time of vulcanization may be reduced to a comparatively small figure, or the amount of 1. 3. 5 trinitrobenzol may be reduced. When elements of the carbon group are used in combination or in admixture with metallic oxides etc., for example litharge and carbon black, will bring about complete vulcanization of rubber with as little as 0.25% of trinitrobenzol. Vulcanization at ordinary temperatures, or temperatures between 50° C. and 100° C., may also be accomplished, whereby it is possible to make use of compounding ingredients and other ingredients which would decompose in the presence of sulphur or which would be spoiled or changed by the temperatures above 100° C. Organic dyes, leather waste, sawdust, wood flour, and like materials may now be added to the trinitrobenzol stocks with perfect safety.

As above stated, elements of the carbon group have the function of accelerating vulcanization of rubber with nitro compounds. As illustrations of the materials which may be employed, the following are mentioned: carbon; carbon black, lamp black, graphite, silicon, carborundum. The accelerating action of these materials is not due to their oxygen absorption properties, for substantially equal acceleration takes place where the elements have been freed of absorbed oxygen or where they have been saturated with it.

As stated in U. S. Patent 1,249,180, vulcanization with nitro compounds is preferably carried out in the presence of amines in order to give further improvement to their aging properties. The amines mentioned in this patent may be employed with entire satisfaction in the present invention. In addition to members of the carbon group, acceleration of vulcanization by nitro compounds is also brought about by practically all of the chemically inert amorphous compounds such as talcs, clays, kieselguhr. I have found that ultramarine, red phosphorus, and aluminum powder also accelerate vulcanization with trinitrobenzol. These chemically inert materials may be used in conjunction with the elements of the carbon group whereby a stronger effect is obtained than when each is used separately. For example a stock containing 100 rubber and 2 of 1. 3. 5 trinitrobenzol does not vulcanize in 180 minutes at 40 lbs. steam pressure. If 10% of litharge be added, vulcanization takes place within 45 minutes and is further reduced by the incorporation of carbon black or of one of the chemically inert ingredients. If 10% of carbon black be added the stock can be made to cure in 10 minutes at 40 lbs.

The above invention has been applied with excellent results to the manufacture of belting, solid tires, rubber cement, mixtures, and leather-like compounds. In regard to the latter stocks containing rubber, trinitrobenzol and carbon black possess a beautiful lustrous black color and in many respects resemble leather, having high tensile strength, with low stretch and set. Trinitrobenzol stocks are absolutely free from the objectionable bloom for the reason that they contain no sulphur. Rubber compounds prepared according to this invention are not affected by temperature, except very high temperatures, and therefore are suitable for use in packings and insulating compounds where they may be compounded to possess the additional advantage of being free from metallic sulphides. These rubber stocks are also acid-proof. They resist aging exceptionally well, showing practically no change even after a period of years, and being free from any surface brittleness or tackiness such as is shown by the sulphur-cured rubber.

Having thus described my invention, what I claim and desire to protect by Letters Patent is:

1. A process for accelerating the vulcanization of rubber without sulphur in the presence of organic nitro compounds which comprises combining rubber with a nitro benzol and an element of the carbon group, and vulcanizing the rubber.

2. A process for accelerating the vulcanization of rubber without sulphur in the presence of organic nitro compounds which comprises combining rubber with 1. 3. 5 trinitrobenzol, and an element of the carbon group, and vulcanizing the rubber.

3. A process for accelerating the vulcanization of rubber without sulphur in the presence of organic nitro compounds which comprises combining rubber with 1. 3. 5 trinitrobenzol, an element of the carbon group and an amine, and vulcanizing the rubber.

4. A process for accelerating the vulcanization of rubber without sulphur in the presence of organic nitro compounds which comprises combining rubber with 1. 3. 5 trinitrobenzol, and an element of the carbon group together with a compound of a metal and an element of the oxygen group, and vulcanizing the rubber.

5. A process for accelerating the vulcanization of rubber without sulphur in the presence of organic nitro compounds which comprises combining rubber with 1. 3. 5 trinitrobenzol, an element of the carbon group and an amine, together with a compound of a metal and an element of the oxygen group, and vulcanizing the rubber.

6. A process for accelerating the vulcanization of rubber without sulphur in the presence of organic nitro compounds which comprises combining rubber with 1. 3. 5 trinitrobenzol, an amine, a metallic oxide, and an element of the carbon group, and vulcanizing the rubber.

7. A process for accelerating the vulcanization of rubber without sulphur in the presence of organic nitro compounds which comprises combining rubber with 1. 3. 5 trinitrobenzol, an amine, a metallic oxide, and elemental carbon, and vulcanizing the rubber.

8. In a process for accelerating the vulcanization of rubber without sulphur in the presence of a nitro benzol, the step of accelerating vulcanization which consists in combining the said rubber nitro benzol mixture, an element of the carbon group, and a chemically inert ingredient, and vulcanizing the rubber.

9. In a process for accelerating the vulcanization of rubber without sulphur in the presence of a nitro benzol, the step of accelerating vulcanization which consists in combining the said rubber nitro benzol mixture, an element of the carbon group, and a chemically inert silicon-containing material, and vulcanizing the rubber.

10. In a process for accelerating the vulcanization of rubber without sulphur in the presence of a nitro benzol, the step of accelerating vulcanization which consists in combining with said rubber-nitrobenzol mixture an element of the carbon group and a clay, and vulcanizing the rubber.

11. In a process for accelerating the vulcanization of rubber without sulphur in the presence of a nitro benzol, the step of accelerating vulcanization which consists in combining with said rubber-nitrobenzol mixture, elemental carbon and a clay, and vulcanizing the rubber.

12. As a new compound a vulcanized rubber containing products of the action of a nitro benzol, an accelerating agent of the carbon group, and an anti-aging material.

13. As a new compound, a vulcanized rubber derived from rubber combined with nitro compounds as vulcanizing agents and elements of the carbon group.

14. As new products vulcanized rubbers derived from rubbers combined with nitro compounds as vulcanizing agents and elemental carbon.

15. As new products vulcanized rubbers derived from rubbers combined with nitro benzols and chemically inert inorganic compounds containing elements of the carbon group.

16. As new products vulcanized rubbers derived from rubbers combined with nitro benzols and chemically inert inorganic compounds containing elemental carbon.

17. As new accelerators for the vulcanization of rubber with nitro compounds, chemically inert inorganic compounds containing silicon in admixture with an element of the carbon group.

18. As new accelerators for the vulcanization of rubber with nitro compounds, a chemically inert clay in admixture with elemental carbon.

Signed at New York, county and State of New York, this 19th day of March, 1925.

IWAN OSTROMISLENSKY.